INVENTOR.
RICHARD L. GOLDEN

United States Patent Office 3,809,724
Patented May 7, 1974

3,809,724
PREPARATION AND RECOVERY OF ALKYLENE GLYCOLS
Richard L. Golden, Oradell, N.J., assignor to Halcon International, Inc.
Filed Sept. 8, 1971, Ser. No. 178,587
Int. Cl. C07c 29/28
U.S. Cl. 260—635 R                13 Claims

ABSTRACT OF THE DISCLOSURE

Ethylene glycol or 1,2-propylene glycol contained in mixtures with lower carboxylate esters of the glycol is recovered by azeotropic distillation of the mixtures with an azeotroping agent forming a minimum boiling azeotrope with the ethylene glycol or 1,2-propylene glycol.

---

Figure 1:
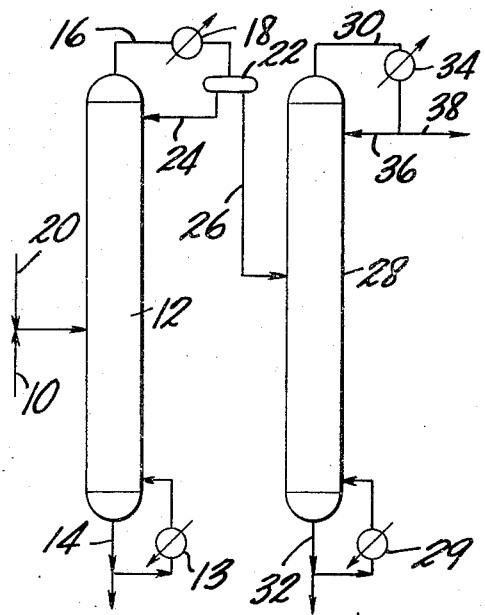

This invention relates to the recovery of ethylene glycol or 1,2-propylene glycol from mixtures containing the glycol in admixture with lower carboxylate esters of the glycol, i.e., the ethylene or propylene glycol monocarboxylate and/or the ethylene or propylene glycol dicarboxylate. The invention is more particularly concerned with the recovery of the glycol from mixtures produced by the hydrolysis of lower carboxylate esters of the glycol.

Ethylene glycol and 1,2-propylene glycol (hereafter referred to as propylene glycol) are chemicals of acknowledged commercial importance. Ethylene glycol is used, for example, in the preparation of anti-freeze compositions and in the manufacture of polyester fibers. Ethylene glycol manufacturing processes of commercial interest have generally been based upon ethylene oxide as a raw material. Recently, however, processes have been developed which make it possible to produce ethylene glycol and propylene glycol without the necessity for the intermediate manufacture of the oxide. These processes employ the liquid phase reaction of the olefin, a carboxylic acid and molecular oxygen in the presence of a catalyst to produce carboxylic acid esters of ethylene or propylene glycol. A process of this type is disclosed in Belgian Pat. No. 738,104. The glycol can be liberated by hydrolysis of the carboxylate esters produced in these processes. However, the conversion of the esters to the glycol is limited by equilibria and the recovery and separation of the glycol produced in the hydrolysis reaction from the unconverted carboxylate esters involves many difficulties because of the formation of glycol-carboxylate ester azeotropes.

It is an object of this invention to provide a process for the effective recovery of ethylene glycol or propylene glycol from mixtures of the glycol with lower carboxylate esters of the glycol.

It is an additional object of this invention to provide a process for the effective recovery of ethylene or propylene glycol produced by the hydrolysis of lower carboxylate esters of the glycol.

It is another object of the invention to provide a process of the character indicated wherein additional amounts of the glycol are produced during the course of the recovery steps.

It is a further object of the invention to provide a process for the separation of ethylene or propylene glycol from reaction mixtures produced by the hydrolysis of lower carboxylate esters of the glycol which can be integrated with the hydrolysis step itself.

Other objects of the invention will be apparent from the following description of the invention and of illustrative embodiments thereof.

The following description is presented with reference to ethylene glycol, it being understood that the description is equally and fully applicable to propylene glycol.

In accordance with the invention, ethylene glycol is separated from mixtures thereof with lower carboxylate esters of ethylene glycol, such as those produced by the hydrolysis of lower carboxylate esters of ethylene glycol, by distilling such mixtures in the presence of an azeotroping agent which is essentially water-immiscible and which forms a minimum-boiling azeotrope with ethylene glycol and which preferably has a boiling point at atmospheric pressure of 135° to 190° C., most preferably 150° C. to 180° C. It has been surprisingly discovered that when the ethylene glycol-containing mixture is distilled in the presence of such azeotroping agents, the tendency of ethylene glycol to form azeotropes with the mono- and di-ethylene glycol carboxylates is no longer a hindrance to the separation of ethylene glycol from the mixture and the azeotrope with the added azeotroping agent, in accordance with the invention, can be readily removed by distillation from the mixture, and the ethylene glycol can be easily recovered from it. Indeed, a further aspect of the invention is that the azeotrope, when condensed, separates into two phases, viz, a phase composed essentially of the azeotroping agent and a phase containing the ethylene glycol. In accordance with the invention, the phase containing the azeotroping agent is readily separated, as by decantation, from the ethylene glycol-containing phase and is returned to the distillation column as reflux. Consequently, the azeotroping agent is merely recirculated in the distillation system and the originally-supplied quantity of azeotroping agent is continually available for reuse except for the very small normally-encountered handling losses.

Suitably the azeotroping agent has a boiling point within the above-indicated 135°–190° C. range at atmospheric pressure, most advantageously within the specified preferred temperature range, but it preferably also forms a minimum-boiling azeotrope which has a boiling point which differs by at least 5° C. from the boiling point at the same pressure of the azeotropes formed by ethylene glycol with any of the ethylene glycol carboxylate esters present in the mixture. Particularly suitable as azeotroping agents are the saturated hydrocarbons, both acyclic and cyclic, the aromatic hydrocarbons, which are, for the most part, alkyl-substituted benzenes, and the halogenated hydrocarbons, especially halogenated aromatic hydrocarbons. An especially preferred azeotroping agent is pseudocumene. Azeotroping agents also include ethers, ketones and alcohols. Table A below identifies examples of azeotroping agents of the character indicated and indicates the boiling point of the azeotrope with ethylene glycol.

TABLE A

| Azeotroping agent | B.P., °C., 760 mm. Hg | |
|---|---|---|
| | Azeotrope | Agent |
| Ethylbenzene | 133 | 136.2 |
| Cumene | 147 | 152.8 |
| Anisole | 150.5 | 153.9 |
| Bromobenzene | 150.2 | 156 |
| 1-bromohexane | 150.5 | 156 |
| 1,2,3-trichloropropane | 150.8 | 156.9 |
| Propylbenzene | 152 | 159 |
| o-Chlorotoluene | 152.5 | 159 |
| 2,7-dimethyl octane | 153 | 160 |
| p-Chlorotoluene | 155 | 162 |
| Mesitylene | 156 | 164.6 |
| 1,3-dibromopropane | 160.2 | 167.3 |
| 2,6-dimethyl-4-heptanone | 164.2 | 168 |
| Pseudocumene | 158 | 169.5 |
| Phenetole | 161.5 | 172 |
| m-Dichlorobenzene | 166 | 172 |
| 2-octanone | 168 | 172.9 |
| Benzylmethyl ether | 159.8 | 174 |
| Decane | 161 | 174 |
| p-Dichlorobenzene | 163 | 174 |
| Heptyl alcohol | 174.1 | 177 |
| p-Cymene | 163.2 | 177 |
| p-Methylanisole | 166.6 | 177 |
| Bis-(2-chloroethyl)ether | 171 | 178 |
| o-Dichlorobenzene | 165.8 | 179 |

As indicated above, the separation process of the invention is applicable to the recovery of ethylene glycol from mixtures of this compound with ethylene glycol lower carboxylate esters produced in any manner, but it is of particular utility in the separation of ethylene glycol from such mixtures produced by the hydrolysis of mono- and/or dicarboxylate esters of ethylene glycol and the separation process can be readily integrated with the hydrolysis operation. The ethylene glycol-ester-feed which is fed to the azeotropic distillation operation of this invention is a mixture of ethylene glycol with lower carboxylate monoesters and/or diesters of ethylene glycol, i.e. esters of ethylene glycol and an alkanoic acid having from 1 to 6 carbon atoms per molecule, such as formic acid, acetic acid, propionic acid, butyric acid, isobutyric acid, and the valeric and the caproic acids. Accordingly, the lower carboxylate monoesters of ethylene glycol include ethylene glycol monoformate, ethylene glycol monoacetate, ethylene glycol monopropionate, ethylene glycol monobutyrate, monovalerates and the ethylene glycol monocaproates, and the diesters include the corresponding diesters of the same alkanoic acids. Ethylene glycol admixed with the ethylene glycol monoformate, ethylene glycol monoacetate, monopropionate, monobutyrate and monoisobutyrate, the corresponding diesters, and mixtures of such monoesters and such diesters, are typical feedstocks and the diacetate-monoacetate mixtures are particularly typical feedstocks. Of course, the ethylene glycol to be separated can also be present in mixtures of esters such as mixtures of ethylene glycol monoacetate and ethylene glycol monopropionate, as well as mixtures with one or more diesters, including mixed diesters such as ethylene glycol acetate propionate. As used herein, therefore, the term "ethylene glycol-ester feed" is intended to include not only mixtures of ethylene glycol with the lower carboxylate ethylene glycol monoester alone or the ethylene glycol diester alone but also mixtures with monoester-diester mixtures or with mixed esters, as well as with mixtures of different ethylene glycol carboxylate esters. In general, mixtures containing the ethylene glycol may contain small amounts of byproducts associated with the preparation of the glycol ester. Such byproducts would normally include small quantities of water and acids, as well as unreacted lower carboxylic acid. They may also include catalyst resdiues and aldehydic byproducts, such as, for example, acetaldehyde and formaldehyde.

The azeotropic distillation process of this invention is particularly applicable to ethylene glycol-ester mixtures containing 5 to 95 mol percent of ethylene glycol.

The distillation unit in which the azeotropic distillation of the invention is carried out can be any convenient fractional distillation unit, e.g. a plate column or a packed column, having a sufficient number of theoretical plates for the desired separation, generally from 20 to 40 theoretical plates. The temperature will, of course, vary with the particular azeotroping agent, since each agent forms a minimum-boiling binary azeotrope with ethylene glycol having a different boiling point but, in general, pot temperatures of 170° to 240° C. are employed in the distillation. Similarly, pressures of from 400 mm. Hg to 50 p.s.i.g. are suitably employed. The azeotrope, when condensed, separates into a first phase, generally the upper phase, composed primarily of the azeotroping agent and into a second phase, generally the lower phase, composed primarily of ethylene glycol; this ethylene glycol phase may contain a small amount of ethylene glycol monocarboxylate ester which, when present in the system, will tend to distill with the azeotropic mixture to a greater or lesser extent depending on the azeotroping agent employed. The vapor condensate from the azeotropic distillation operation is therefore passed to a separator or decanter and the azeotroping agent-containing phase is returned as reflux to the distillation column. It will be understood, however, that operation outside the above-mentioned temperature and pressure ranges is possible and, the specific choice of specific combinations of conditions is entirely within the scope of persons skilled in the art.

Ethylene glycol is recovered from the ethylene glycol phase by distillation, extraction, or other appropriate means, although distillation is preferred. Suitably, the ethylene-glycol-containing phase from the azeotropic condensate is subjected to further distillation to remove an overhead comprising any ethylene glycol monocarboxylate ester which may be present along with a relatively small amount of ethylene glycol, together with any azeotroping agent which may be present, and pure ethylene glycol is withdrawn as bottoms product. This distillation is carried out under appropriate distillation conditions, most suitably at temperatures of 150° to 210° C., and pressures of 150 mm. Hg to 5 p.s.i.g. The overhead product from this last-mentioned distillation step is advantageously recycled by combining it with the feed to the azeotropic distillation column.

As previously mentioned, the ethylene glycol recovery process of this invention is particularly adapted to be integrated with the hydrolysis of ethylene glycol lower carboxylate esters, i.e. ethylene glycol lower carboxylate monoesters, diesters and mixtures of monoesters and diesters, i.e. it can follow the hydrolysis operation in order to recover the ethylene glycol which is produced. Thus, the ethylene-glycol-ester feed to the azeotropic distillation can comprise the effluent from the hydrolysis of ethylene glycol carboxylate esters, suitably after removal of water and carboxylic acid, which effluent will contain not only the ethylene glycol monoester and generally the ethylene glycol diester but will also contain varying amounts of ethylene glycol. Thus, the reaction mixture from which the ethylene glycol is to be separated can be prepared by partially hydrolyzing mono- or di-carboxylate esters of ethylene glycol, or mixtures of said esters, by heating the ester or esters in the presence of water. Although the hydrolysis reaction will take place solely under the influence of heat, it may be preferred, in order to increase the rate of reaction, to effect hydrolysis in the presence of an acidic hydrolysis catalyst.

The feed to the hydrolysis operation can consist essentially of the monoester, or of the diester, or of mixtures of mono- or diesters in any proportion. The effluent from reaction which produce ethylene glycol monoester or ethylene glycol diester, or mixtures of the two, can be fed to the hydrolysis reaction. Typical reaction effluents of this nature are described, for example, in the above-mentioned Belgian Pat. 738,104, wherein the monoester is produced in the presence of substantial quantities of the diester, and in British Pat. No. 1,124,862, wherein the production of monoester substantially free from diester is disclosed. The hydrolysis step can be applied to glycol esters produced in any manner, whether by the process of the Belgian patent or the British patent or by various other processes. The hydrolysis reactions, regardless of the exact composition of the feed, continue until an equilibrium mixture comprising diester, monoester, ethylene glycol, carboxylic acid and water is formed. Before feeding the hydrolysis reaction product to the azeotropic distillation, the water and carboxylic acid are preferably removed from the hydrolysis effluent, e.g. by distillation in any convenient manner, these two compounds being readily separated from the ethylene glycol and the lower carboxylate esters. In effecting the hydrolysis, the ethylene glycol lower carboxylate ester, or ester mixture, is suitably heated in the presence of water until at least some hydrolysis has occurred. Although the hydrolysis reaction will take place solely under the influence of heat, it may be preferred, in order to increase the rate of reaction, to effect hydrolysis in the presence of an acidic hydrolysis catalyst such as a mineral acid, e.g. sulphuric acid and phosphoric acid, but most preferably a solid catalyst, e.g. in the form of an acidic ion exchange resin, is employed. The hydrolysis step is thus suitably carried out by causing the glycol ester or ester mixture to react under the influence of heat (with or without a catalyst) to liberate (i.e. hydrolyze) from 15 to 80 mol percent of the acyl moieties, e.g. acetate moieties, as lower carboxylate acid, e.g. acetic acid. At the same time ethylene glycol is liberated.

In the hydrolysis reaction, it is desirable to use at least 0.25 mol of water per equivalent of acyl moiety present in the hydrolysis feed. Preferably the amount of water added is in the range of from about .75 to 5 mols of water per equivalent of acyl moiety. Of course, greater amounts of water can be used, for example up to 20 mols per equivalent of acyl moiety, but the use of such large amounts of water is both unnecessary and economically disadvantageous.

Hydrolysis reaction temperatures of at least about 50° C. are necessary in order to obtain economically satisfactory rates of hydrolysis except that, when catalyst are employed, temperatures as low as 25° C. can be satisfactorily used. It is generally not desirable to employ hydrolysis reaction temperatures above about 250° C., however, since at higher temperatures thermal degradation, with concomitant formation of color bodies, can become significant. Preferably temperatures of about 50° C. to about 200° C. are employed. Pressure is not, in any manner, critical to the conduct of the hydrolysis as long as it is sufficient at the prevailing temperature to keep the reaction mixture in the liquid phase. Thus, presures of as little as 50 mm. Hg can be employed as also can pressures of several thousand p.s.i.a. Residence time of reactants and products within the hydrolysis zone is in no way critical and any practically obtainable residence times are suitable. Thus, for example, residence times from as little as 1 minute up to and including several hours, e.g. 4 hours, or longer are entirely feasible.

Any conventional ester hydrolysis catalyst can be used, e.g. acids, metal ions and the like, but the preferred catalysts are acidic materials such as the mineral acids, e.g. hydrochloric, sulfuric and phosphoric acids, and also include organic acids such as oxalic, tartaric and malic acids, as well as such materials as trichloracetic acid and the aryl sulfonic acids, e.g. p-toluene sulfonic acid. When used, such catalysts are employed in relatively small amounts, e.g. quantities of as little as 0.0001 mol per equivalent of acyl moiety in the feed to the hydrolysis zone being suitable. Larger proportions can be employed though there is little practical reason to employ amounts greater than about 0.001 mol of acid per equivalent of glycol moiety in the feed, and excessive catalyst quantities can adversely affect glycol quality. It is most preferred, however, to use solid catalysts such as acidic ion exchange resins or molecular sieves, e.g. metal alumina silicates (siliceous zeolites) such as molecular sieves of the "A" and "X" series, e.g. "Molecular Sieve 4A," and other acidic heterogeneous solid catalysts which can be used in the form of beds through which the feed to be hydrolyzed can be continuously passed, so that no separation step is necessary. Typical examples of suitable ion exchange resins include cationic exchange resins of the sulfonic acid type, such as the polystyrene sulfonic acids, exemplified by commercial products sold under the names Dowex–50, Duolite C–20, and Ionac Z40.

Following the hydrolysis reaction, the hydrolyzate, which contains carboxylic acid, e.g. acetic acid, and water, in addition to ethylene glycol, monoesters, and diesters, is, as mentioned, suitably passed into a distillation column wherein a major portion of the carboxylic acid and water is vaporized and removed as overhead for subsequent recovery. This separation can be carried out in any conventional distillation column, such as used for the azeotropic distillation. In general, it is desirable to separate at least 90% of the water and carboxylic acid present in the mixture before proceeding with the removal and recovery of the ethylene glycol. Although, as mentioned, the distillation step to separate water and carboxylic acid can be carried out over a wide range of conditions, it has been found preferable to operate at pot temperatures of 170° to 240° C. and at pressures of from 400 mm. Hg to 50 p.s.i.g. It will be understood that the water and carboxylic acid can be removed in a single distillation operation or the distillation may be carried out in two distillation zones in series with the water and some of the carboxylic acid being removed in the first distillation zone and the remainder of the carboxylic acid to be removed being separated in the second distillation zone. This distillation step is suitably carried out in conventional manner and the selection of specific conditions for treatment of specific feeds to separate specific amounts of water and carboxylic acid will be readily apparent to persons skilled in the art.

As previously indicated, the azeotropic distillation process of this invention is applicable to the separation of ethylene glycol from ethylene glycol-ester mixtures containing varying amounts of the glycol. When, however, the content of ethylene glycol is relatively low, e.g. below 10 mol percent, and if the feed to the azeotropic distillation contains meaningful amounts of lower carboxylate monoester of ethylene glycol, e.g. at least 15 mol percent, it is advantageous to effect a disproportionation of the monoester as described in the co-pending application of John Kollar entited "Method of Producing Polyhydric Compounds" and filed of even date herewith. When the disproportionation is effected simultaneously with the azeotropic distillation, the newly-produced ethylene glycol is immediately removed from the system.

As described in that application, in the presence of a catalyst which is generally characterized as a weak base, lower carboxylate monoesters of alkylene glycols such as ethylene glycol and propylene glycol undergo, without the need for the presence of an extraneous reactant, what may be characterized as a disproportionation reaction to produce ethylene glycol or propylene glycol and the corresponding lower carboxylate diester of ethylene glycol or propylene glycol as illustrated in the following equation:

2 alkylene glycol monoester→alkylene glycol+alkylene glycol diester

To provide a catalyst suitable for use in the disproportionation reaction there is used a compound which is a weak base in itself, or a substance which forms a weak base in situ in the presence of ethylene glycol carboxylate esters. For example, there may be used:

(a) Metals and metal compounds, such as lithium, sodium, potassium, calcium, beryllium, magnesium, zinc, cadmium, strontium, aluminum, lead, chromium, molybdenum, manganese, iron, cobalt, germanium, nickel, copper, mercury, tin, boron, antimony, bismuth, and cerium as the metal, or as an oxide, hydride, carboxylate such as formate or acetate, alcoholate, or glycolate, or metal alkyl, for example tetrabutyl tin, cadmium acetate, lead acetate, zinc acetate, and dibutyl tin diacetate, (b) Tertiary amines, such as trimethyl amine, triethyl diamine, and dimethyl stearyl amine, (c) Quaternary ammonium salts of weak acids, such as tetramethyl ammonium acetate.

The preferred type of catalyst is that of group (a) above, and the preferred individual catalysts are carboxylates of tin, lead, zinc, magnesium and cadmium, especially the acetates.

The amount of catalyst employed can vary, so long as there is an amount effective to cause the reaction to proceed. A generally suitable quantity is from 0.001 to 5% by weight based upon the ethylene glycol monoester contained in the ester feed to the disproportionation zone. Preferably, the amount of catalyst is 0.01 to 10% and a particularly preferred quantity is 0.1 to 5%. Greater quantities can be used, the maximum amount being generally limited by economic considerations. The catalyst, if desired, can be added directly to the disproportionation zone, but the catalyst is preferably added to the ester feed prior to its introduction into the disproportionation zone.

The residence time of the reactants in the disproportionation zone can also vary and, since increased residence times favor increased conversion of the ethylene glycol monoester to ethylene glycol (and to ethylene glycol diester) a residence time sufficient to effect a reasonable conversion should be employed, e.g. at least about 0.25 minute and, in general, the maximum residence time is governed only by the economics of the system. Preferably, however, a residence time of at least 2 minutes should be employed and, as a general rule, residence times longer than 50 minutes are not particularly useful.

The disproportionation reaction is equilibrium limited to relatively modest conversions of monoester and it is thus very advantageously effected simultaneously with the azeotropic distillation because the disproportionation is driven toward completion in the azeotropic distillation column by the stagewise removal of ethylene glycol as it is formed. Furthermore, the azeotropic distillation temperatures favor the disproportionation reaction. Pressure is not a parameter of the reaction and the pressures prevailing in the azeotropic distillation zone are entirely suitable.

Figure 2:
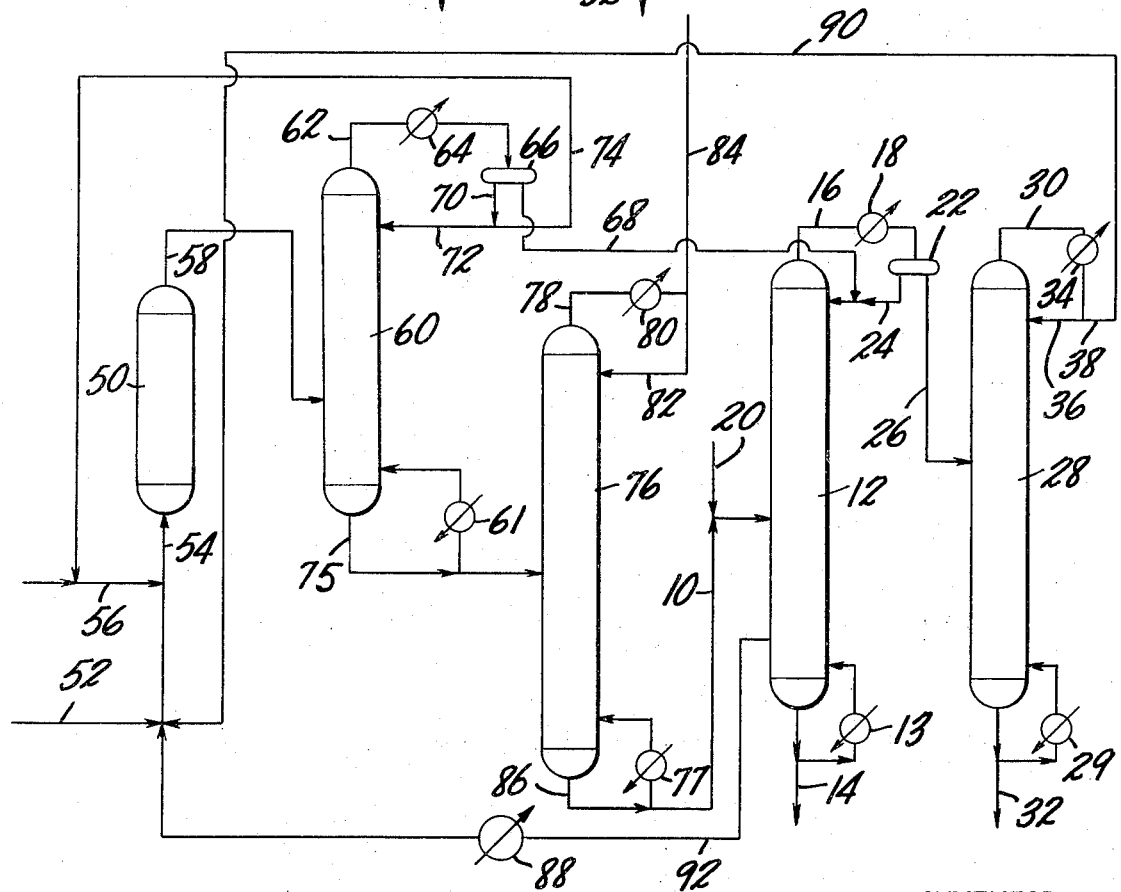

The invention will be more fully understood by reference to the accompanying drawing, wherein:

FIG. 1 is a diagrammatic view of an ethylene glycol recovery system embodying the azeotropic distillation system of the invention, and FIG. 2 is a similar diagrammatic view of an overall system wherein the azeotropic distillation recovery system is integrated with an ethylene glycol ester hydrolysis.

Referring to the drawing, and more particularly to FIG. 1, an ester feed stream comprising an ethylene glycol ester mixture is fed through line 10 to azeotropic distillation zone 12 which, in the embodiment illustrated, is a distillation column suitably provided with heating means, e.g. a conventional reboiler 13 and with a bottoms withdrawal line 14 and an overhead vapor line 16, the latter being connected to a condenser 18. If it is desired to effect disproportionation of ethylene glycol monoester, the required catalyst can be introduced through line 20 so that it may be admixed with the ester feed prior to its introduction into the azeotropic distillation zone. The ethylene glycol is removed through line 16 in the form of an azeotrope with the azeotroping agent, and glycol ester is withdrawn through line 14. The overhead vapor from column 12 leaves through line 16 and is condensed in condenser 18, flows to a phase-separator 22, and the condensed azeotroping agent is returned to column 12 through line 24 as reflux, whereas the ethylene glycol phase is withdrawn through line 26 and is introduced into a refining column 28, also provided with a heating means, suitably in the form of a reboiler 29. In column 28, ethylene glycol ester and azeotroping agent contained in the ethylene glycol phase withdrawn from phase separator 22 is removed as vapor through line 30, and ethylene glycol in substantially purified form is withdrawn as bottoms through line 32. The vapors in line 30 are condensed in condenser 34 and a portion is returned as reflux to column 28 through line 36 and the remainder is withdrawn through line 38. Some or all of the material in line 38 may be combined with the feed to column 12, and make-up azeotroping agent, as required, is also suitably added through line 10 or through line 20, or added to line 24.

Referring now to FIG. 2, wherein the azeotropic distillation system just described is integrated with the hydrolysis of lower carboxylate esters of ethylene glycol to provide the feed to azeotropic distillation column 12, a hydrolysis ester feed stream enters a hydrolysis zone 50 through line 52 and line 54 and water for the hydrolysis enters through line 56 and is combined with the hydrolysis ester feed in line 54 before entering zone 50. Zone 50 is suitably filled with a bed of solid hydrolysis catalyst, e.g. a bed of acidic ion exchange resin and the combined water and ester feed stream flows upwardly through the bed and the hydrolyzed reaction product is removed through line 58. The product stream in line 58 is introduced into a water separation column 60, provided with a reboiler 61 or other heating means. In column 60, water is vaporized and, along with a small amount of carboxylic acid, is withdrawn through line 62 and condensed in condenser 64. Since, in the embodiment illustrated in FIG. 2, the condensate from condenser 64 will contain some azeotroping agent, as will be explained below, the condensate passes to a phase separator 66 wherein the water and carboxylic acid form one phase and the azeotroping agent forms a second phase, the latter being withdrawn from separator 66 through line 68. The aqueous phase is withdrawn through line 70, with part of it being returned to column 60 through line 72 as reflux and the remainder being recycled to reactor 50 through line 74 which empties into water supply 56. The portion of the hydrolysis product stream supplied to column 60 which is not vaporized and withdrawn through line 62 and which comprises ethylene glycol, carboxylic acid and lower carboxylate esters of ethylene glycol is withdrawn through line 75 and fed to a distillation column 76, also provided with appropriate heating means, e.g. a reboiler 77. In distillation column 76, the carboxylic acid is vaporized and carboxylic acid vapors are withdrawn through line 78 and condensed in condenser 80 with some of the condensate being returned to column 76 as reflux through line 82 and the remainder being withdrawn from the system through line 84. The carboxylic acid stream will also contain any water which was not separated in column 60. The essentially water- and carboxylic acid-free ethylene glycol-lower carboxylate ester mixture is withdrawn from distillation zone 76 through line 86 and is supplied to line 10 to provide the ester feed to azeotropic distillation zone 12, as described above in connection with the discussion of FIG. 1. To complete the integration of the azeotropic distillation system with the hydrolysis system, a line 90 connects with line 38 to conduct the withdrawn condensate containing azeotroping agent from column 28 to the feed to hydrolysis zone 50 and a side stream from column 12 comprising vapors of lower carboxylate esters of ethylene glycol is withdrawn through line 92 and also combined with the feed to the hydrolysis zone, after being condensed by condenser 88. A small purge stream comprising liquid esters and disproportionation catalyst, if present, is withdrawn through line 14 in order to remove any disproportionation catalyst which may be present from the system, which can then be recovered and recycled to line 20. If, however, the hydrolysis is carried out thermally, i.e. without the use of a catalyst, or if no disproportionation catalyst is present, then the ester stream from the azeotropic distillation zone to the hydrolysis zone can be a liquid stream, e.g. the line 92 can be connected to line 14. Keeping disproportionation catalyst out of the hydrolysis zone as much as possible is only of significance when a solid acidic ion exchange resin is present since the catalyst will be retained by the resin, necessitating regeneration or replacement of the resin sooner than would otherwise be the case. Actually, the solid hydrolysis catalyst will eventually become contaminated with minor amounts of impurities which may be contained in the hydrolysis feed and will need to be regenerated in conventional manner, or replaced.

The following examples of specific application will serve to give a fuller understanding of the invention but it will be understood that these examples are illustrative only and are not intended as limiting the invention.

EXAMPLE I

A feed mixture composed of 30.4 wt. percent ethylene glycol diacetate (EGDA), 56.9 wt. percent ethylene glycol monoacetate (EGMA), 12.7 wt. percent ethylene glycol (EG) is introduced into an Oldershaw distillation column consisting of 30 glass trays of 1" in diameter above the feed point and 20 trays of 1" in diameter below the feed point and provided with a 300 cc. electrically-heated glass reboiler powered with a Variac set to maintain a constant temperature of 186° C. in the reboiler, and the mixture is distilled in the presence of o-chlorotoluene as azeotroping agent, which is introduced onto the top tray of the column. The overhead vapors (153° C.) are condensed in a sloping glass tube condenser and the condensed two-phase liquid is decanted in a Dean-Stark tube. The heavier liquid comprising ethylene glycol and ester is drawn off periodically and the lighter liquid comprising the o-chlorotoluene is decanted through the overflow line and is pumped to the top tray of the column at a fixed flow rate.

During steady state operation 150 cc. per hour of the feed mixture is introduced at the feed point and 220 cc. per hour of o-chlorotoluene (AA) is introduced on the top plate to provide a mol ratio of AA fed to EG in the feed of about 4.75. Most of the AA supplied is reflux of the lighter liquid to which make-up AA is added to compensate for that passing into the withdrawn overhead phase. The overhead vapors upon condensation form an AA phase and a product phase, the latter being formed and withdrawn from the system at the rate of 39 g. per hour, and being composed primarily of EG with minor amounts of EGMA and AA and being free from EGDA. Analysis of the bottoms shows that it contains only about 0.8% ethylene glycol. Thus, recovery of the ethylene glycol from the feed mixture is about 95% and substantially pure ethylene glycol is readily obtained by fractional distillation of the product phase.

EXAMPLE II

Using the feed mixture and the apparatus of Example I, but using p-dichlorobenzene as azeotroping agent (AA), the feed mixture is introduced into the column at the rate 150 cc. per hour and the AA is fed to the top plate at the rate of 124 cc. per hour to provide an AA fed to EG in the feed mixture mol ratio of 3. The pot temperature is maintained at 188° C. and the overhead vapor temperature is 164° C. The overhead product phase is withdrawn at the rate of about 26 g. per hour and shows the following analysis (wt. percent):

EG—73.6
EGMA—10
EGDA—nil
AA—16.4

Analysis of the bottoms shows that it contains only about 1.3% ethylene glycol and thus recovery of the ethylene glycol from the mixture is about 91%, and substantially pure ethylene glycol is produced by fractional distillation of the overhead product phase.

EXAMPLE III

The azeotroping agent of Example II is replaced by m-dichlorobenzene and distillation is carried out at a pot temperature of 185° C. and an overhead vapor temperature of 162° C., with reflux to provide an AA fed to EG in the feed mol ratio of 2. Corresponding results are obtained.

EXAMPLE IV

The procedure of Examples II and III are followed using a feed comprising 58 wt. percent ethylene glycol monoacetate, 25 wt. percent ethylene glycol diacetate and 17 wt. percent of ethylene glycol. In two experiments using as azeotroping agents ethylbenzene (192° C. pot temp., 134° C. overhead temp., 6.6 mol ratio) and cumene (191° C. pot temp., 149° C. overhead temp., 3.6 mol ratio), highly effective removal of ethylene gliycol from the mixture is realized.

EXAMPLE V

A hydrolysis-distillation system as illustrated in FIG. 2 is used for continuously hydrolyzing an ester mixture containing some ethylene glycol and composed of approximately 54 mol percent of ethylene glycol diacetate, 41 mol percent of ethylene glycol monoacetate, and 5 mol percent ethylene glycol, and subsequently recovering ethylene glycol from the system by azeotropic distillation.

The following discussion relates to the operation of this system after steady state conditions are attained.

The fresh feed mixture is introduced through line 56 at a rate to provide, per hour, 244.7 lb. mols EGDA, 184.9 lb. mols EGMA, and 24.4 lb. mols EG, and this mixture is combined with recycle streams 90 and 92 to provide a flow of approximately 1855 lb. mols/hr. EGDA and 1843 lb. mols/hr. EGMA, and 64 lb. mols/hr. EG, into hydrolysis zone 50, which is maintained at a temperature of 90° C. and consists of a 1500 cubic foot bed of Dowex 50W–X8 ion exchange resin. At the same time water is introduced at the rate of approximately 654.3 lb. mols/hr. make up water and approximately 530.7 lb. mols/hr. recycle water containing a small amount of acetic acid. The partially-hydrolyzed product (about 87% of the ethylene glycol diacetate fed to the hydrolysis zone remains unconverted) is withdrawn through line 58 and passed to the 9th plate from the top of column 60 which contains approximately 53 actual plates and is operated at a reboiler temperature of 175° C. and at atmospheric pressures, with a reflux ratio of 2:1 to separate as overhead the water-acetic acid recycle stream and a bottoms stream comprising the remainder of the hydrolysis effluent which is passed to the 36th plate from the top of column 76 which has 60 actual plates and is operated at a reboiler temperature of 182° C. and at atmospheric pressure, with a reflux ratio of 0.75:1. Azeotroping agent in recycle stream 90 is removed in separator 66 and returned to column 12 through line 68. In column 76 the remainder of the acetic acid and water are separated and withdrawn through line 84. The bottoms product from column 76, comprising the ester and glycol components of the hydrolysis reaction product is introduced onto the 20th plate from the top of the azeotropic distillation column 12 which contains 55 actual plates and employs pseudocumene as azeotroping agent which is continuously recycled to the column through lines 24 and 68 and is present in an amount to provide a ratio of azeotroping agent to ester-glycol feed of approximately 0.4:1. All of the azeotroping agent condensed and separated in separator 22 is returned to column 12 and the ethylene glycol phase from separator 22, which contains approximately 11 mol percent EGMA, and 3 mol percent pseudocumene, and is free from EGDA, is fed to refining column 28 which contains 60 actual plates and is operated at a reboiler temperature of 173° C. and at atmospheric pressure, with a reflux ratio of 6.8:1 and there is obtained a bottoms product consisting essentially of ethylene glycol, which is withdrawn at the rate of approximately 444 lb. mols/hr., and the net overhead, as previously mentioned, is recycled to the hydrolyzer through line 90. A vapor stream composed substantially entirely of ethylene glycol diacetate is withdrawn through line 92 from above the 53rd plate from the top of column 12 and, after condensation in condenser 88, provides the previously mentioned recycle stream.

EXAMPLE VI

A system as illustrated in FIG. 2 is used for continuously hydrolyzing an ester mixture containing some ethylene glycol and composed of approximately 54 mol percent of ethylene glycol diacetate, 41 mol percent of ethylene glycol monoacetate, and 5 mol percent ethylene glycol, and subsequently disproportionating the ethylene glycol monoacetate and recovering ethylene glycol from the system by azeotropic distillation. The following discussion relates to the operation of this system after steady state conditions are attained.

The fresh feed mixture is introduced through lines 56 at a rate to provide, per hour, 244.7 lb. mols EGDA, 184.9 lb. mols EGMA, and 24.4 lb. mols EG, and this mixture is combined with recycle streams 90 and 92 to provide a flow of approximately 1170 lb. mols/hr. EGDA and 247.8 lb. mols/hr. EGMA, and 63.4 lb. mols/hr. EG, into hydrolysis zone 50, which is maintained at a temperature of 90° C. and consists of about an 800 cubic foot bed of Dowex 50W–XB ion exchange resin. At the same time water is introduced at the rate of approximately 656.4 lb. mols/hr. make up water and approximately 530.9 lb. mols/hr. recycle water containing a small amount of acetic acid. The partially-hydrolyzed product (about 55% of the EGDA fed to the hydrolysis zone remains unconverted) is withdrawn through line 58 and passed to the 9th plate from the top of column 60 which contains 53 actual plates and is operated at a reboiler temperature of about 152° C. and at atmospheric pressure, with a reflux ratio of 2:1 to separate as overhead the water-acetic acid recycle stream and a bottoms stream comprising the remainder of the hydrolysis effluent which is passed to the 12th plate from the top of column 76 which has 28 actual plates and is operated at a reboiler temperature of 182° C. and at atmospheric pressure, with a reflux ratio of 1.6:1. Azeotroping agent in recycle stream 90 is removed in separator 66 and returned to column 12 through line 68. In column 76 the remainder of the acetic acid and water are separated and withdrawn through line 84. The bottoms product from column 76, comprising the ester and glycol components of the hydrolysis reaction, has a disproportionation catalyst added to it, in this specific case lead acetate, at the rate of approximately 0.30 lb. mol/hr., and the mixture is introduced onto the 20th plate from the top of the azeotropic distillation column 12 which contains 55 actual plates and employs pseudocumene as azeotroping agent which is continuously recycled to the column through lines 24 and 68 and is present in an amount to provide a ratio of azeotroping agent to ester-glycol feed of approximately 1:1. All of the azeotroping agent condensed and separated in separator 22 is returned to column 12 and the ethylene glycol phase from separator 22, which contains approximately 11 mol percent EGMA, 4 mol percent pseudocumene, and is free from EGDA, is fed to refining column 28 which contains 60 actual plates and is operated at a reboiler temperature of 173° C. and at a pressure of 200 mm. Hg, with a reflux ratio of 7:1 and there is obtained a bottoms product consisting essentially of ethylene glycol, which is withdrawn at the rate of approximately 444 lb. mols/hr., and the net overhead, as previously mentioned, is recycled to the hydrolyzer through line 90. An ester purge stream of 9 lb. mols./hr. (calculated as ethylene glycol diacetate) and containing the catalyst is withdrawn through line 14, and a vapor stream is withdrawn into line 92 from the 53rd plate from the top of column 12 and condensed to provide the previously mentioned recycle stream.

In the foregoing examples, the hydrolysis feed contains ethylene glycol and a substantial amount of ethylene glycol monoester which is representative of a feed which would normally be available from the processing of a carboxylate ester product produced by the reaction of acetic acid and ethylene, but corresponding effective operation is also realized when this example is repeated with a feed containing essentially no ethylene glycol or lesser amounts of ethylene glycol monoacetate or composed essentially of ethylene glycol diacetate. Such feeds require appropriate adjustment in the operation of the distillation units as will be obvious to persons skilled in the art. Ethylene glycol, which is recovered as the product of this process is of high-purity such that it can be used directly in the production of fiber-grade polyesters.

What has been said above with regard to the treatment of lower carboxylate esters of ethylene glycol and with respect to the removal and recovery of ethylene glycol also applies, as previously indicated, to the treatment of lower carboxylate esters of propylene glycol and to the removal and recovery of propylene glycol, use being made of azeotroping agents of the character indicated which form minimum-boiling azeotropes with the propylene glycol. Such azeotroping agents include o-xylene (azeo. B.P. 135.8° C.), dibutyl ether (azeo. B.P. 136° C.), and 2-octanone (azeo. B.P. 169° C.). Thus, when Examples I to VI are repeated using feeds comprising propylene glycol diacetate, propylene glycol monoacetate, and propylene glycol, and employing azeotroping agents such as those enumerated above, corresponding results are achieved and effective recovery of propylene glycol is realized. In like manner, corresponding results are obtained when the esters of other lower alkanoic acids are used in place of the acetic acid esters, for example, the formates and the propionates. It is intended, therefore, that all matter contained in the foregoing description shall be interpreted as illustrative only and not as limitative of the invention.

I claim:

1. A process for recovering ethylene glycol or propylene glycol from a mixture comprising ethylene glycol or propylene glycol in admixture with at least one of a mono-lower carboxylate ester and a di-lower carboxylate ester of said ethylene glycol or propylene glycol which comprises the steps of:
   (a) subjecting said mixture to distillation in a distillation zone in the presence of an azeotroping agent effective to form a minimum-boiling azeotrope with said glycol, said azeotroping agent being essentially-water-immiscible and having a boiling point at atmospheric pressure of about 135° to 190° C. and forming a minimum-boiling azeotrope with the glycol which has a boiling point which differs by at least 5° C. from the boiling point at the same pressure of the azeotropes formed by the glycol with any of the glycol carboxylate esters present in the mixture, whereby an overhead product and a bottoms product are produced, said overhead product comprising an azeotrope of said azeotroping agent and glycol, and said bottoms product comprising said ester substantially reduced in glycol content,
   (b) separating said overhead product into a first phase comprising said azeotroping agent and a second phase comprising said glycol,
   (c) returning said first phase to said distillation zone as reflux, and
   (d) recovering substantially pure glycol from said second phase.

2. A process for recovering ethylene glycol or propylene glycol from a feed mixture comprising ethylene glycol or propylene glycol in admixture with at least one of a lower mono-carboxylate ester and a di-lower carboxylate ester of the ethylene or propylene glycol which comprises the steps of:
   (a) subjecting said mixture to distillation in a primary distillation zone in the presence of an azeotroping agent effective to form a minimum-boiling azeotrope with said glycol, said azeotroping agent being essentially water-immiscible and having a boiling point at atmospheric pressure of about 135° to 190° C. and forming a minimum-boiling azeotrope with the glycol which has a boiling point which differs by at least 5° C from the boiling point at the same pressure of the azeotropes formed by the glycol with any of the glycol carboxylate esters present in the mixture, whereby a primary overhead product and a primary bottoms product are produced, said primary overhead product comprising an azeotrope of said azeotroping agent and glycol and lesser amounts of said ester, and said primary bottoms product comprising said ester substantially reduced in glycol content,
   (b) separating said overhead product into a first phase comprising said azeotroping agent and a second phase comprising said glycol and said lesser amounts of said ester,
   (c) returning said first phase to said primary distillation as reflux, and
   (d) subjecting said second phase to distillation in a secondary distillation zone to produce a secondary overhead product and a secondary bottoms product, said secondary bottoms product comprising glycol substantially free from said azeotroping agent and said ester, and said secondary overhead product comprising said azeotroping agent and said ester.

3. A process as defined in claim 2, further comprising the step of passing said secondary overhead product into said primary distillation zone.

4. A process as defined in claim 1, wherein said feed mixture to said distillation zone is produced by partially hydrolyzing with water at least one lower carboxylate ester of ethylene glycol or of propylene glycol.

5. A process as defined in claim 1, wherein said azeotroping agent is a saturated hydrocarbon, an aromatic hydrocarbon, a halogenated hydrocarbon, an ether, a ketone, or an alcohol.

6. A process as defined in claim 1, wherein said azeotroping agent is selected from the group consisting of ethylbenzene, cumene, anisole, bromobenzene, 1-bromohexane, 1,2,3 - trichloropropane, propylbenzene, o-chlorotoluene, 2,7 - dimethyl octane, p-chlorotoluene, mesitylene, 1,3 - dibromopropane, 2,6 - dimethyl - 4 - heptanone, pseudocumene, phenetole, m-dichlorobenzene, 2-octanone, benzylmethyl ether, decane, p-dichlorobenzene, heptyl alcohol, p-cymene, p-methylanisole, bis(2 - chloroethyl) ether and o-dichlorobenzene.

7. A process as defined in claim 1, wherein said azeotroping agent is pseudocumene.

8. A process for preparing ethylene glycol or propylene glycol from a hydrolysis product resulting from the hydrolysis with water of a mixture comprising mono- and di-lower carboxylate esters of ethylene glycol or propylene glycol wherein said esters are at least partially hydrolyzed to produce a hydrolyzate comprising the glycol, carboxylic acid, and water in admixture with unhydrolyzed mono- and di-lower carboxylate esters which comprises:
 (a) distilling said hydrolyzate to vaporize said water and said carboxylic acid away from said glycol and said esters and to produce a bottoms mixture comprising said glycol and said esters, said distilling being carried out in two distillation zones, said water being primarily removed in the first of said two distillation zones and said carboxylic acid being primarily removed in the second of said two distillation zones.
 (b) subjecting said mixture to distillation in a primary distillation zone in the presence of an azeotroping agent effective to form a minimum boiling azeotrope with said glycol, said azeotroping agent being essentially water-immiscible and having a boiling point at atmospheric pressure of about 135° to 190° C., whereby a primary overhead product and a primary bottoms product are produced, said primary overhead product comprising an azeotrope of said azeotroping agent and said glycol and lesser amounts of said mono-ester and said primary bottoms product comprising said diester and monoester substantially reduced in glycol content,
 (c) separating said overhead product into a first phase comprising azeotroping agent, and a second phase comprising said glycol containing minor amounts of said azeotroping agent and said monoester,
 (d) returning said first phase to said primary distillation zone as reflux, and
 (e) subjecting said second phase to distillation in a secondary distillation zone to produce a secondary overhead product and a secondary bottoms product, said secondary bottoms product comprising said glycol substantially free from said azeotroping agent and said ester and said secondary overhead product comprising said azeotroping agent and said monoester.

9. A process comprising the steps of:
 (a) subjecting a mixture comprising mono- and di-lower carboxylate esters of ethylene glycol or propylene glycol to hydrolysis with water in a hydrolysis zone to hydrolyze at least part of said esters to produce a hydrolyzate comprising the glycol, carboxylic acid, and water in admixture with unhydrolyzed mono- and di-lower carboxylate esters,
 (b) distilling said hydrolyzate to vaporize said water and said carboxylic acid away from said glycol and said esters and to produce a bottoms mixture comprising said glycol and said esters,
 (c) subjecting said mixture to distillation in a primary distillation zone in the presence of an azeotroping agent effective to form a minimum-boiling azeotrope with said glycol, said azeotroping agent being essentially water-immiscible and having a boiling point at atmospheric pressure of about 135° to 190° C., whereby a primary overhead product and a primary bottoms product are produced, said primary overhead product comprising an azeotrope of said azeotroping agent and said glycol and lesser amounts of said monoester and said primary bottoms product comprising said diester and monoester substantially reduced in glycol content,
 (d) separating said overhead product into a first phase comprising said azeotroping agent, and a second phase comprising said glycol containing minor amounts of said azeotroping agent and said monoester,
 (e) returning said first phase to said primary distillation zone as reflux, and
 (f) subjecting said second phase to distillation in a secondary distillation zone to produce a secondary overhead product and a secondary bottoms product, said secondary bottoms product comprising said glycol substantially free from said azeotroping agent and said monoester and said secondary overhead product comprising said azeotroping agent and said monoester.

10. A process as defined in claim 9, wherein said hydrolysis is carried out in the presence of a solid hydrolysis catalyst to produce said hydrolyzate comprising the glycol, carboxylic acid, and water, in admixture with lower carboxylate mono- and diesters of said glycol.

11. A process as defined in claim 9, wherein step (b) is carried out in two distillation zones, the water being primarily removed in the first of said two distillation zones and the carboxylic acid being primarily removed in the second of said two distillation zones.

12. A process comprising the steps of:
 (a) subjecting a mixture comprising mono- and di-lower carboxylate esters of ethylene glycol or propylene glycol to hydrolysis with water in a hydrolysis zone in the presence of a solid hydrolysis catalyst to hydrolyze at least part of said esters to produce a hydrolyzate comprising the glycol, carboxylic acid, and water in admixture with unhydrolyzed mono- and di-lower carboxylate esters,
 (b) distilling said hydrolyzate to vaporize said water and said carboxylic acid away from said glycol and said esters and to produce a bottoms mixture comprising said glycol and said esters, said distilling being carried out in two distillation zones, said water being primarily removed in the first of said two distillation zones and said carboxylic acid being primarily removed in the second of said two distillation zones,
 (c) subjecting said mixture to distillation in a primary distillation zone in the presence of an azeotroping agent effective to form a minimum-boiling azeotrope with said glycol, said azeotroping agent being essentially water-immiscible and having a boiling point at atmospheric pressure of about 135° to 190° C. and forming a minimum-boiling azeotrope with the glycol which has a boiling point which differs by at least 5° C. from the boiling point at the same pressure of the azeotropes formed by the glycol with any of the glycol carboxylate esters present in the mixture and being selected from the group consisting of a saturated hydrocarbon, an aromatic hydrocarbon, a halogenated hydrocarbon, an ether, a ketone, and an alcohol, whereby a primary overhead product and a primary bottoms product are produced, said primary overhead product comprising an azeotrope of said azeotroping agent and said glycol and lesser amounts of said monoester and said primary bottoms product comprising said diester and monoester substantially reduced in glycol content, (d) separating said overhead product into said azeotroping agent as a first phase and glycol containing minor amounts of said azeotroping agent and said monoester as a second phase, (e) returning said first phase to said primary distillation zone as reflux, and (f) subjecting said second phase to a distillation in a secondary distillation zone to produce a secondary overhead product and a secondary bottoms product, said secondary bottoms product comprising said glycol substantially free from said azeotroping agent and said monoester and said secondary overhead product comprising said azeotroping agent and said monoester.

13. A process as defined in claim 12, wherein said lower carboxylate monoester is caused to undergo disproportionation to form glycol and lower carboxylate diester in step (c) during said distillation in the presence of said azeotroping agent.

References Cited

UNITED STATES PATENTS

| | | | |
|---|---|---|---|
| 3,647,892 | 3/1972 | Hoch | 260—637 R |
| 3,586,716 | 6/1971 | Yasui et al. | 260—637 R |
| 3,074,962 | 1/1963 | Anderson | 203—69 |
| 2,218,234 | 10/1940 | Fisher | 203—70 |
| 3,609,198 | 9/1971 | Yamagshi et al. | 203—DIG 6 |
| 3,223,734 | 11/1965 | Fallstad et al. | 203—DIG 6 |
| 3,506,408 | 4/1970 | Kageyamer et al. | 203—DIG 6 |
| 2,081,322 | 5/1937 | Carney | 203—DIG 6 |
| 3,350,415 | 10/1967 | Binning | 203—70 |
| 3,574,772 | 4/1971 | Becker et al. | 260—637 R |
| 3,066,116 | 11/1962 | Schiller. | |

WILBUR L. BASCOMB JR., Primary Examiner

U.S. Cl. X.R.

260—637 R; 203—62, 63, 67, 68, 69, 70, 81, 82, 84, DIG 6